United States Patent
Fujikawa et al.

(10) Patent No.: US 11,105,892 B2
(45) Date of Patent: Aug. 31, 2021

(54) RADAR APPARATUS AND METHOD OF DISPLAYING TRAIL

(71) Applicant: FURUNO ELECTRIC CO., LTD., Nishinomiya (JP)

(72) Inventors: Takumi Fujikawa, Nishinomiya (JP); Yugo Kubota, Nishinomiya (JP)

(73) Assignee: FURUNO ELECTRIC COMPANY LIMITED, Nishinomiya (JP)

( * ) Notice: Subject to any disclaimer, the term of this patent is extended or adjusted under 35 U.S.C. 154(b) by 417 days.

(21) Appl. No.: 16/087,581

(22) PCT Filed: Feb. 21, 2017

(86) PCT No.: PCT/JP2017/006317
§ 371 (c)(1),
(2) Date: Sep. 21, 2018

(87) PCT Pub. No.: WO2017/163716
PCT Pub. Date: Sep. 28, 2017

(65) Prior Publication Data
US 2019/0129000 A1 May 2, 2019

(30) Foreign Application Priority Data
Mar. 23, 2016 (JP) .............................. JP2016-059000

(51) Int. Cl.
*G01S 7/06* (2006.01)
*G01S 7/12* (2006.01)
*G01S 13/93* (2020.01)

(52) U.S. Cl.
CPC ................ *G01S 7/066* (2013.01); *G01S 7/12* (2013.01); *G01S 13/93* (2013.01)

(58) Field of Classification Search
None
See application file for complete search history.

(56) References Cited

U.S. PATENT DOCUMENTS

| | | | |
|---|---|---|---|
| 2004/0046688 A1* | 3/2004 | Bigge | G01S 13/86 342/52 |
| 2010/0214151 A1 | 8/2010 | Kojima et al. | |

(Continued)

FOREIGN PATENT DOCUMENTS

| | | |
|---|---|---|
| DE | 10 2013 111 841 A1 | 4/2014 |
| EP | 2 600 171 A1 | 6/2013 |

(Continued)

OTHER PUBLICATIONS

International Search Report issued in PCT/JP2017/006317; dated May 23, 2017.

(Continued)

*Primary Examiner* — Whitney Moore
(74) *Attorney, Agent, or Firm* — Studebaker & Brackett PC (57) ABSTRACT

The purpose is to provide a radar apparatus which can create and display only necessary trail data. The radar apparatus may include an acquisition module, an echo data creation module, a memory, a trail data creation module, and a display unit. The acquisition module may acquire an echo based on a reflected wave from a target object, of a transmitted electromagnetic wave. The echo data creation module may create, based on the echo, echo data at least indicative of a position of the target object. The memory may store determination data set, for every given display area, whether trail data indicative of a moving trail of the target object is to be newly created based on the echo. The trail data creation module may create the trail data based on the echo and the determination data. The display unit may display the echo data and the trail data.

20 Claims, 5 Drawing Sheets

(56) References Cited

U.S. PATENT DOCUMENTS

| | | | | |
|---|---|---|---|---|
| 2012/0139786 A1* | 6/2012 | Puzella | ............... | H01Q 1/3216 |
| | | | | 342/368 |
| 2013/0265186 A1* | 10/2013 | Gelli | ......................... | G01S 7/02 |
| | | | | 342/32 |
| 2014/0126822 A1* | 5/2014 | Underwood | .............. | G06T 7/33 |
| | | | | 382/174 |
| 2019/0101622 A1* | 4/2019 | Wilson | .................... | G01S 13/93 |

FOREIGN PATENT DOCUMENTS

| JP | H01-202682 A | 8/1989 |
|---|---|---|
| JP | H11-23707 A | 1/1999 |
| JP | 2008-039557 A | 2/2008 |
| JP | 2008-209199 A | 9/2008 |
| JP | 2010-197263 A | 9/2010 |

OTHER PUBLICATIONS

The extended European search report issued by the European Patent Office dated Oct. 31, 2019, which corresponds to European Patent Application No. 17769762.0-1206 and is related to U.S. Appl. No. 16/087,581.

\* cited by examiner

| LAND DETERMINATION | SIGNAL LEVEL OF ECHO IS ABOVE GIVEN VALUE | PROCESSING |
|---|---|---|
| YES | YES | PREVIOUS TRAIL DATA LEVEL-1 |
| YES | NO | PREVIOUS TRAIL DATA LEVEL-1 |
| NO | YES | CREATE NEW TRAIL DATA |
| NO | NO | PREVIOUS TRAIL DATA LEVEL-1 |

RADAR APPARATUS AND METHOD OF DISPLAYING TRAIL

CROSS-REFERENCE TO RELATED APPLICATIONS

This application is the National Stage of PCT Application No. PCT/JP2017/006317, filed Feb. 21, 2017 which claims the benefit of Japanese Application No. 2016-059000, filed Mar. 23, 2016. The entire contents of the above-identified applications are hereby incorporated by reference herein.

TECHNICAL FIELD

The present disclosure mainly relates to a radar apparatus capable of displaying a trail of acquired echoes.

BACKGROUND

Conventionally, for example, in order to avoid a collision with other moving bodies, radar apparatuses which detect and display target objects which exist around the apparatus are known. A radar apparatus of JP2011-59019A displays trails of other moving bodies on a radar image. As a display type of the trail, there are a true trail mode and a relative trail mode. In the true trail mode, the trail of echoes is displayed based on absolute locations of the acquired echoes. Therefore, there is an advantage of being easy to grasp behaviors of other target objects from the displayed trails in the true trail mode. On the other hand, in the relative trail mode, the trail of echoes is displayed based on a relative spatial relationship with the apparatus. Therefore, there is an advantage of being easy to grasp risky target objects which are approaching relatively to the apparatus in the relative trail mode. Thus, by displaying the trails of other moving bodies, since move directions of other moving bodies become intelligible, collisions can be avoided more securely.

SUMMARY

However, in the conventional radar apparatus, since the trails of all the acquired echoes are displayed, for example, a trail corresponding to echoes of land is also displayed. Particularly when displaying the trails in the relative trail mode, the trail of the echoes of land is also displayed. Moreover, when displaying the trails in the true trail mode, the trail of land is also displayed due to error or delay of information on the ship, such as a position of a ship and a heading. Generally, since the echo of land is large, many areas of a display screen are covered with the trail of land. Therefore, the visibility of other echoes and trails is lowered. Moreover, in the case where a large number of the target objects are displayed on the display screen, the visibility of the echoes and the trails is lowered if the trails of all the target objects are displayed.

The present disclosure is made in view of the above situations, and a main purpose thereof is to provide a radar apparatus which can create and display only necessary trail data.

The problem to be solved by the present disclosure is similar to the above, and the configuration and effects for solving this problem will be described.

According to the first aspect of this disclosure, a radar apparatus with the following configuration is provided. That is, the radar apparatus may include an acquisition module (a receiver), an echo data creation module (processing circuitry), a memory, a trail data creation module (processing circuitry), and a display. The acquisition module may acquire an echo based on a reflected wave from a target object, of a transmitted electromagnetic wave. The echo data creation module may create, based on the echo, echo data at least indicative of a position of the target object. The memory may store determination data set, for every given display area, whether trail data indicative of a moving trail of the target object is to be newly created based on the echo. The trail data creation module may create the trail data based on the echo and the determination data. The display unit may display the echo data and the trail data.

Thus, since the trail data can be created only for some of the echoes, only necessary trail data can be created and displayed, for example.

With the radar apparatus, the trail data creation module may maintain the existence of the trail data when the trail data created previously exists in an area for which the trail data is not to be newly created.

Thus, it can be prevented that necessary trail data is removed during operation.

With the radar apparatus, the determination data may be updated for every scan or every given scans.

Thus, since the determination data is updated for every scan or every given scans, accuracy of the determination may further be improved.

With the radar apparatus, the determination data may be updated for every sweep or every given sweeps.

Thus, since the determination data is updated for every sweep or every given sweeps, the determination accuracy may further be improved.

With the radar apparatus, the determination data may be set, for every pixel of the display, whether the trail data indicative of the moving trail of the target object is to be newly created.

Thus, the area for which the determination is performed may be made smaller so that the trail data may be displayed in detail.

With the radar apparatus, the determination data may define whether the trail data is to be newly created according to a kind of the target object.

Thus, the trail data may be created only for the target object of a given kind.

With the radar apparatus, the determination data may identify an area where an echo of land exists as an area for which the trail data is not to be newly created.

Alternatively, with the radar apparatus, the determination data may identify an area where an echo of a moving target object exists as the area for which the trail data is to be newly created.

The necessity of displaying the trail of the land may be low, rather it may degrade the visibility of other echoes. Therefore, by performing either one of the above processing, the trail data of the land may be prevented from being created and the trail of the echo of the moving target object may be displayed.

With the radar apparatus, the determination data may define whether the trail data is to be newly created according to a property of the echo.

Thus, since information on the target object may be obtained by using the property of the echo, the trail data of the necessary echo may be created.

With the radar apparatus, the trail data may be indicative of a relative positional change of the echo with respect to the apparatus.

In a case where the relative positional change of the echo is displayed, since the positional change of a target object which does not move is also displayed, unnecessary trail may be displayed. Thus, the effect in which the trail data can be created only for some of the echoes is more effectively exerted.

According to the second aspect of this disclosure, the following method of displaying a trail is provided. That is, the method of displaying a trail may include acquiring (receiving), creating echo data, creating determination data, creating trail data, and displaying. In the acquiring, an echo is acquired based on a reflected wave from a target object, of a transmitted electromagnetic wave. In the creating echo data, echo data at least indicative of a position of the target object is created based on the echo. In the creating determination data, determination data set, for every given display area, whether trail data indicative of a moving trail of the target object is to be newly created is created based on the echo. In the creating the trail data, the trail data is created based on the echo and the determination data. In the displaying, the echo data and the trail data are displayed.

DETAILED DESCRIPTION

Figure 1:
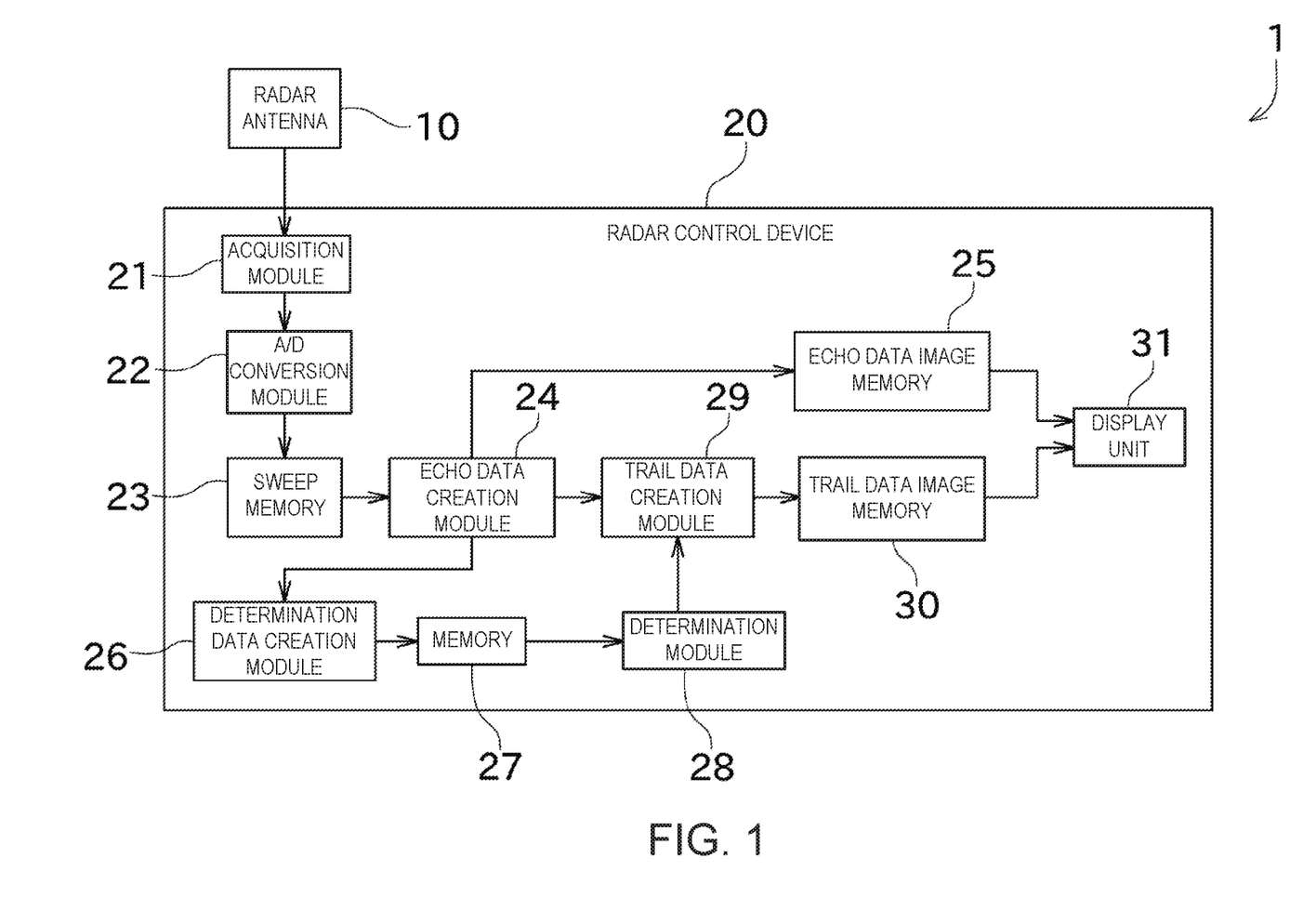
FIG. 1 is a block diagram illustrating a configuration of a radar apparatus according to one embodiment of the present disclosure.
Figure 2:
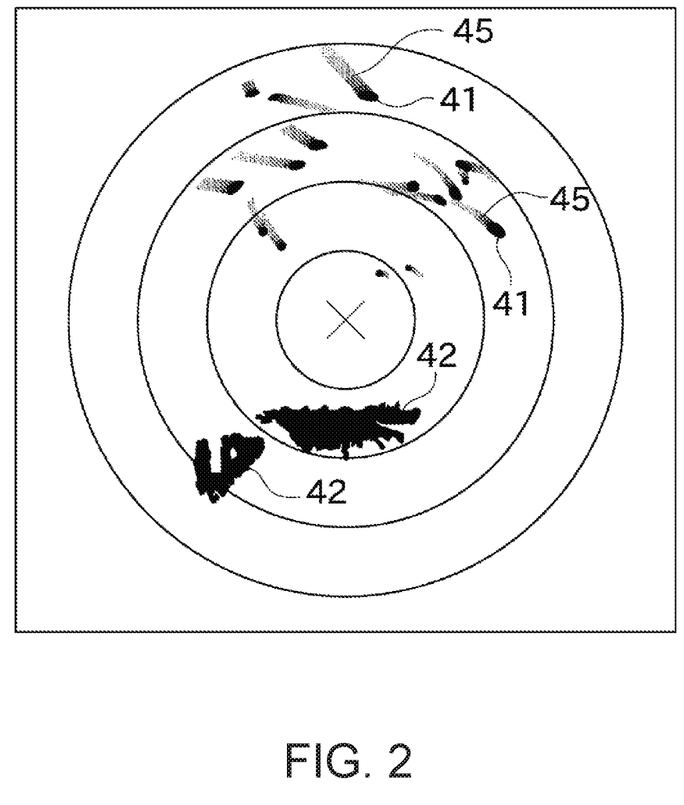
FIG. 2 is a view illustrating a radar image where echoes and trails are displayed.

Next, one embodiment of the present disclosure is described with reference to the drawings. FIG. 1 is a block diagram illustrating a substantial configuration of a radar apparatus 1 for a ship according to this embodiment. FIG. 2 is a view illustrating a radar image where echoes and the trails are displayed.

A radar antenna 10 provided to the radar apparatus 1 of this embodiment may transmit a pulse-shaped transmission wave (electromagnetic wave) generated by a magnetron, and receive a reflected wave of the transmission wave as a reception signal. Note that the transmission wave transmitted by the radar apparatus 1 may not be limited the pulse shape, but may be a continuous wave. Moreover, the transmission wave may be generated by not the magnetron but a semiconductor device etc.

Moreover, the radar antenna 10 may repeat the transmission and reception of the transmission wave, while rotating in a horizontal plane at a given rotation cycle. Thus, it may be detectable over 360° centering on the ship in the horizontal plane. The reception signal acquired by the detection of the radar antenna 10 may be outputted to a radar control device 20.

The radar control device 20 may generate the transmission wave by a magnetron, a transmitting circuit, etc. (not illustrated), and process the reception signal inputted from the radar antenna 10. Each component of the radar control device 20 (particularly, an acquisition module 21, an echo data creation module 24, a determination module 28, and a trail data creation module 29) may be implemented by an arithmetic processor provided to the radar control device 20, such as FPGA, ASIC, or CPU (not illustrated).

The reception signal (signal including an echo) inputted from the radar antenna 10 may be acquired by the acquisition module 21 of the radar control device 20. The reception signal acquired by the acquisition module 21 may be inputted into an A/D conversion module 22. The A/D conversion module 22 may sample this signal, convert it into digital data comprised of a plurality of bits, and output the data to a sweep memory 23.

The sweep memory 23 may be capable of storing the reception signals on real time corresponding to one sweep. Note that the "sweep" refers to a series of operations from a transmission of the transmission wave to a subsequent transmission of the transmission wave, and the "reception signals corresponding to one sweep" refers to the reception signals acquired during a period from a transmission of the transmission wave to a subsequent transmission of the transmission wave. In addition, the "scan" refers to operation which the radar apparatus 1 acquires the series of reception signals around the ship.

The echo data creation module 24 may create echo data which is data indicative of the position of a target object, a signal level of the echo, etc. based on the echo included in the reception signal. Here, a period of time from the transmission of the transmission wave to the return of the echo is proportional to a distance from the radar antenna 10 to a target object. Therefore, a distance to the target object can be calculated based on the period of time from the transmission of the transmission wave to the reception of the reception signal. Moreover, a direction in which the target object exists can be calculated based on an antenna angle when the transmission wave is transmitted. As described above, the echo data creation module 24 may obtain the position of the target object corresponding to the echo, based on the echo included in the reception signal.

Moreover, the echo data creation module 24 may obtain the signal level of the echo based on amplitude of the reception signal. The echo data creation module 24 may obtain the position of the target object and the signal level of the echo, and create the echo data. The echo data creation module 24 may output the created echo data to an echo data image memory 25, a determination data creation module 26, and a trail data creation module 29. Note that the echo data creation module 24 may create the echo data each time the reception signal is inputted, and output it to each component.

The echo data image memory 25 may be an image memory used in order to display the echo data created by the echo data creation module 24. The image indicative of the echo data stored in the echo data image memory 25 may be outputted to a display unit 31.

The display unit 31 may be a liquid crystal display etc., and be a raster scan type display device. The echo data created as described above may be displayed on the display unit 31. FIG. 2 illustrates one example of the radar image, where a central symbol indicates the position of the ship. An echo 41 may be an echo of another ship. An echo 42 may be an echo of land. Note that the position of the ship may be offset from the center. The display unit 31 may update the displayed contents each time the echo data is inputted.

The trail data creation module 29 may create the trail data based on the echo data inputted from the echo data creation module 24. The trail may be a trail of the movement (positional change) of the target object. The trail data may be data for displaying the moving trail of the target object on the screen. Note that the trail data creation module 29 may create the trail data each time new echo data is inputted, and output it to the trail data image memory 30.

Here, as methods of displaying the trails, there are a relative trail mode in which a relative positional change of a target object with respect to this ship (this apparatus) is displayed as a trail, and a true trail mode in which an absolute positional change of the target object is displayed as the trail. In the relative trail mode, the relative positional change of the target object with respect to the ship may be displayed on the screen as the trail. In the true trail mode, the actual positional change of the target object may be displayed on the screen as the trail, regardless of the movement of the ship. Although in this embodiment one example in which the trail is displayed using the relative trail mode will be described, the present disclosure may also be applied to the true trail mode.

The trail data outputted from the trail data creation module 29 may be outputted to the trail data image memory 30. The trail data image memory 30 may be an image memory used in order to display the trail data created by the trail data creation module 29. The image indicative of the trail data stored in the trail data image memory 30 may be outputted to the display unit 31. In the radar image of FIG. 2, a trail 45 may be indicated corresponding to the echo 41.

The trail 45 may be displayed so that its color becomes deeper (i.e., its transparency becomes lower) as it is closer to the echo 41. Thus, a newer trail can be displayed so as to be more emphasized than an older trail. Note that this indication is one example, and it may be displayed so that its hue changes as it is closer to the echo 41. Alternatively, it may be displayed in the same color (i.e., its hue, chroma or saturation, and brightness are all the same), without distinguishing between the newer trail and the older trail.

In the conventional radar apparatus, the trails are displayed for all the echoes. Therefore, the trail is displayed also for the echo of land, and the visibility of other echoes and trails is lowered. In this regard, as illustrated in FIG. 2, the radar apparatus 1 of this embodiment may control so that the trail is not displayed for the land echo 42, while displaying the trail 45 for the echo 41 of another ship.

Figure 3:
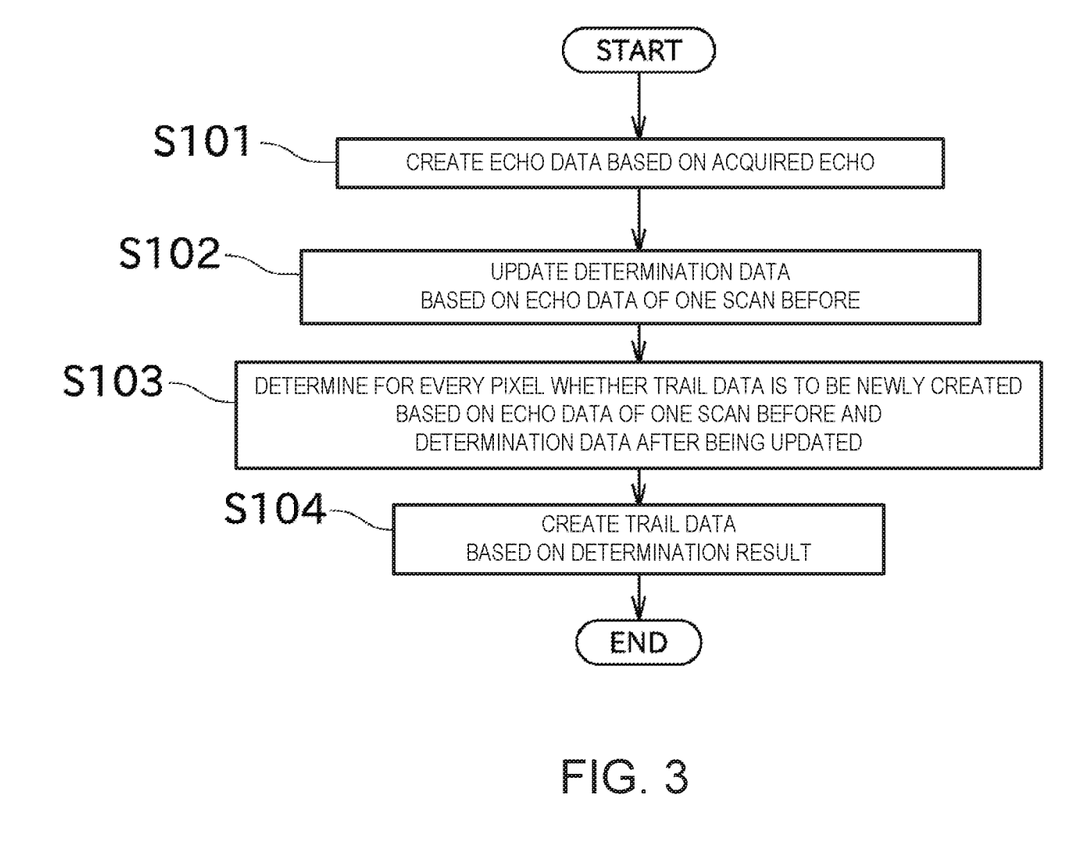
FIG. 3 is a flowchart illustrating processing which creates echo data and trail data.
Figure 4:
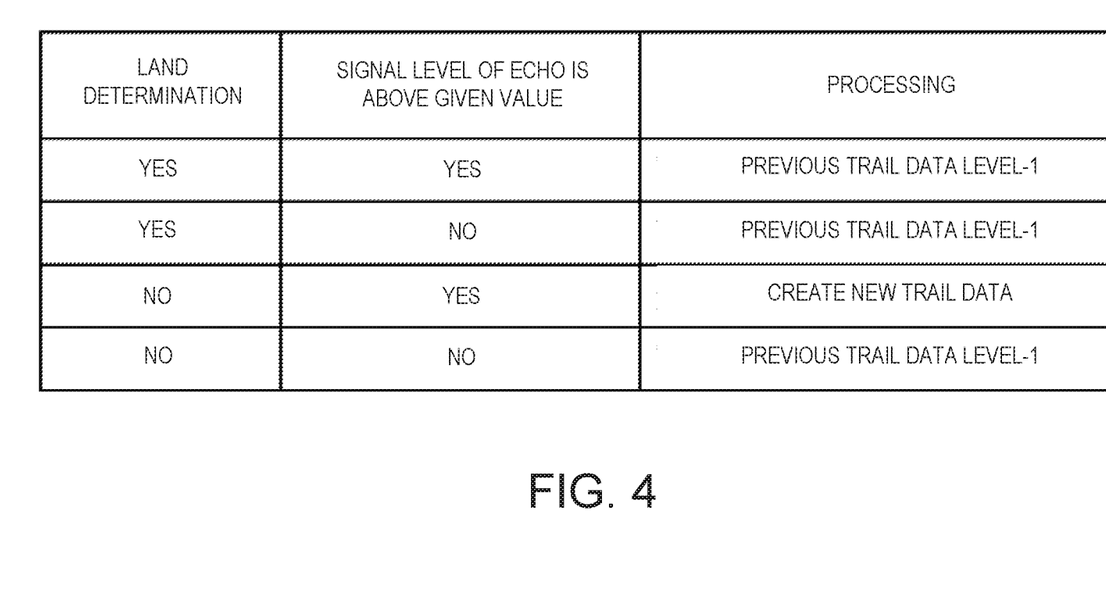
FIG. 4 is a table illustrating processing which creates the trail data based on the results of a land determination of the echoes, and a signal level of the echoes.
Figure 5:
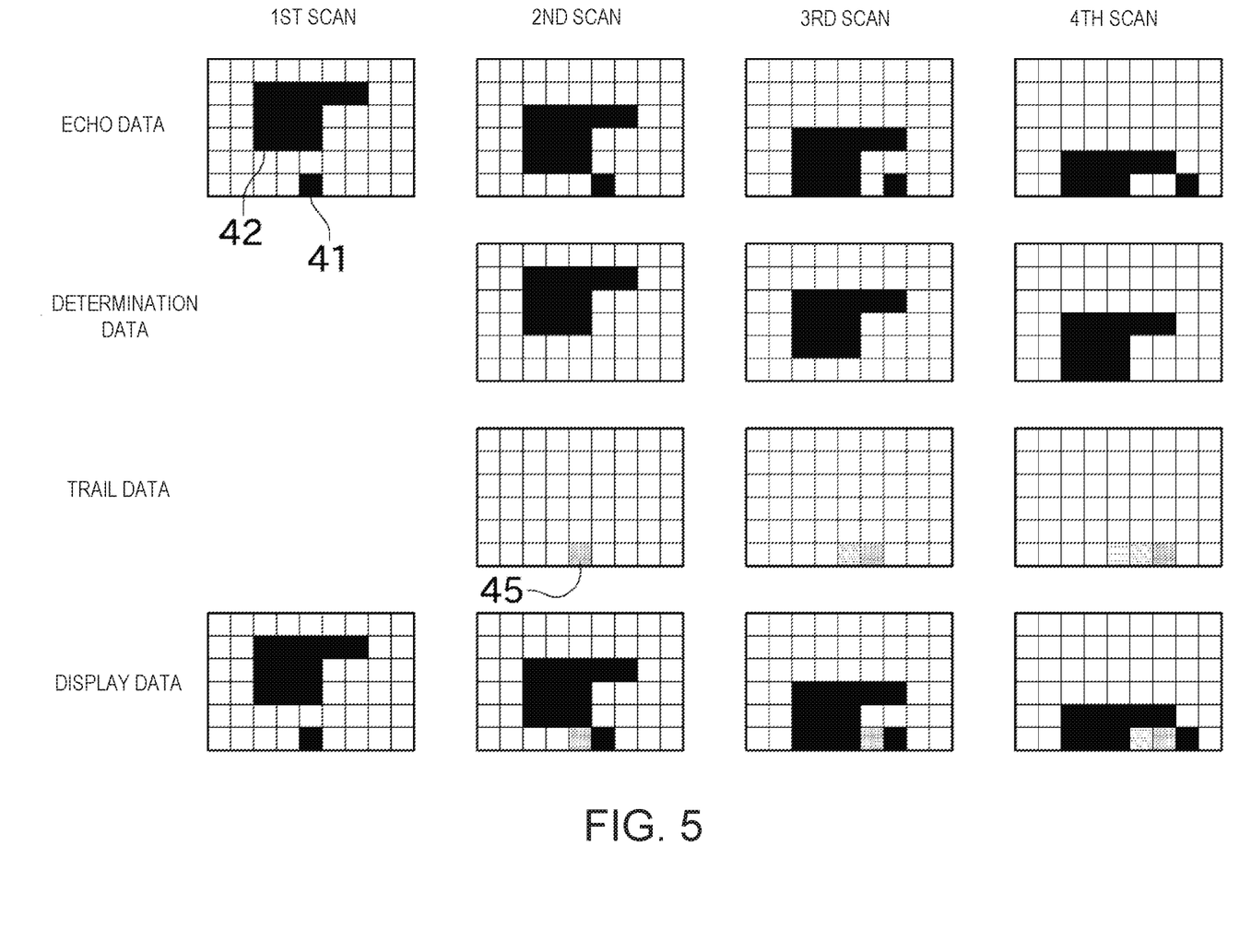
FIG. 5 is a view illustrating transition of the echo data, the determination data, trail data, and display data.

Below, a control according to a method of displaying the trails only for the echoes other than land is described with reference to FIGS. 3 to 5. FIG. 3 is a flowchart illustrating processing which creates the echo data and the trail data. FIG. 4 is a table illustrating processing which creates the trail data based on the result of the land determination of the echo, and a signal level of the echo. FIG. 5 is a view illustrating transition of the echo data, the determination data, the trail data, and the display data.

The radar apparatus 1 may include the determination data creation module 26, a memory 27, and the determination module 28, as a configuration for displaying the trails only for the echoes other than land.

The determination data creation module 26 may create the determination data which is data of whether a trail is to be newly created for every given display area (in detail, for every pixel). The memory 27 may store the determination data created by the determination data creation module 26. Note that the determination data may use a plurality of pixels as one unit of a display area, instead of using one pixel as one unit of the display area. The determination module 28 may determine whether the trail is to be newly displayed for every display area (for every pixel) based on the determination data of the memory 27.

Next, along the flowchart of FIG. 3, a flow of the processing which creates the trail is described. The acquisition module 21 may acquire the reception signal from the radar antenna 10 (acquisition step). The echo data creation module 24 may create the echo data based on the echo acquired by the acquisition module 21 (S101, echo data creation step). The echo data created by the echo data creation module 24 may be outputted to the echo data image memory 25, the determination data creation module 26, and the trail data creation module 29, as described above. Here, the echo data creation module 24 may sequentially create echo data as illustrated in a first to fourth scans of FIG. 5. These echo data may include the echo 41 of another ship, the land echo 42. Note that the position of the land echo moves downwardly in the screen because the ship moves upwardly in the screen.

The determination data creation module 26 may update the determination data based on the echo data of one scan before, and then store it in the memory 27 (S102, determination data creation step). Note that the determination data creation module 26 may update the determination data not based on the echo data of one scan before but based on the latest echo data. Here, the determination data of this embodiment may be data for preventing the trail data from being newly created for the land echo when creating the trail data, and particularly, data which specifies the area indicative of the land echo (i.e., an area for which the trail data is not newly created) for the echo acquired by the acquisition module 21.

In the row of the determination data of the second scan of FIG. 5, an area corresponding to the land echo 42 among the echo data of the first scan may be identified. Note that the echo data of the first scan may be used for the determination data of the second scan because the trail data of the first scan is displayed for the first time in the radar image of the second scan. Therefore, pixels of the echo of the land of the second scan may be identified in the determination data of the third scan.

The determination data creation module 26 may obtain, for example, the size of the echo, and if the size of the echo exceeds a given threshold, it may determine that the echo is the land echo. Note that the determination data creation module 26 may be configured to determine that the echo is the land echo, if a moving speed (absolute speed) of the echo is below the given threshold, in addition to the size of the echo. The method of determining that the echo is the land echo or other echoes is arbitrarily, and for example, the determination may be made by comparing information on a map or a nautical chart and the absolute position of the echo.

The determination data creation module 26 may update the determination data stored in the memory 27, when the new determination data is created based on the echo data of one scan before. The update of the determination data may be performed for every scan. Note that, it is desirable to update the determination data after the trail data is created and before the subsequent trail data is created (i.e., each time the trail data is created), but the update timing is arbitrary as long as the updated is performed. For example, the determination data may be updated for every plural scans, or may be updated at a given time interval. Alternatively, the determination data may be updated for every sweep or every given sweeps(s) (one sweep or a plurality of sweeps). Moreover, the timing at which the four data illustrated in FIG. 5 are created (updating) is arbitrary, and each data does not need to be created so as to be synchronized with each other. Note that the memory 27 may be a nonvolatile memory, such as a flash memory (a flash disc, a memory card, etc.), a hard disc drive, or an optical disc, or may be a volatile memory, such as RAM, for example.

Next, the determination module 28 may determine for every area whether the trail data is to be newly created based on the echo data of one scan before and the determination data after being updated (S103, determination step). Specifically, the determination module 28 may consider that the echo within the area identified by the determination data is the land echo. On the contrary, the determination module 28 may consider that the echo within the area which is not identified by the determination data is the echo other than land. Thus, it can be determined whether the echo data of one scan before is the land echo or the echo other than land (i.e., whether or not it is the echo for which the trail data is to be newly created).

The trail data creation module 29 may create the trail data based on the echo data and the determination data (in this embodiment, the determination result of the determination module 28) (S104, trail data creation step). When making the color thinner as the trail data becomes older like this embodiment, the created trail data may be lowered in a trail data level (level indicative of an intensity to display the trail data (color depth etc.)) for every scan. That is, the newly created trail data may have the highest trail data level (its color may be deepest). Then, the trail data level may be lowered for every scan (its color may be made thinner).

Specifically, the trail data creation module 29 may create the trail data based on the table of FIG. 4. In FIG. 4, two of "land determination" and "signal level of echo is above given value" are described. The "land determination" may be the echo considered to be the land echo by the determination module 28. The "signal level of echo is above given value" may literally indicate that the signal level of the echo is above the given value. Since the trail may be displayed also for noise when the trail is created with a low signal level of the echo, the trail data may be configured to be created when the signal level of the echo is above the given value. Note that this processing is not essential. That is, the "signal level of echo is above given value" may be replaced with "existence of echo."

In the case of the top of the table of FIG. 4, i.e., the echo is the land echo and the signal level of the echo is above the given value, a value obtained by subtracting 1 (a given value) from a previous trail data level may be used as a new trail data level. That is, when the determination module 28 determines that the echo is land, the new trail data may not be created even if the signal level of the echo is above the given value, but the lowering of the previous trail data level may only be performed. Note that no processing may be performed in particular when the previous trail data is not included in the area concerned.

Moreover, in the second case from the top of the table of FIG. 4, i.e., when the echo is the land echo and the signal level of the echo is below the given value, the value obtained by subtracting 1 from the previous trail data level may be used as the new trail data level, similar to the above. Moreover, in the third case from the top of the table of FIG. 4, i.e., when the echo is not the land echo and the signal level of the echo is above the given value, the trail data may newly be created. That is, the new trail data may be created for the area which the determination module 28 determines that the echo is the echo other than land. In the fourth case from the top of the table of FIG. 4, i.e., when the echo is not the land echo and the signal level of the echo is below the given value, the value obtained by subtracting 1 from the previous trail data level may be used as the new trail data level.

By processing as above, the trail data may not newly be created for the land echo. Also in FIG. 5, the trail 45 is not created for the land echo 42 among the echo 41 of another ship and the land echo 42. However, even if it is the area where the land echo 42 exists (the area for which the trail data is not newly created), the existence of the trail data may be maintained only by subtracting 1 from the trail data level when the trail data created previously exists.

Also in FIG. 5, at the fourth scan, three trails 45 of the echo 41 of another ship are located in a line, and although the oldest trail 45 is within the area where the land echo 42 exists, the existence of the trail 45 is maintained. Note that, in the display data of the fourth scan, this oldest trail 45 is not displayed because it is overlapped with the land echo 42, but when the time passes and the position of the land echo 42 changes, this trail 45 will be displayed.

The display data of FIG. 5 may be data displayed on the display unit 31. The display data may be data which is obtained by superimposing the echo data with the trail data. Note that, in this embodiment, when the echo data and the trail data are overlapped, echo data may be displayed prior to the trail data.

As described above, the radar apparatus 1 may include the acquisition module 21, the echo data creation module 24, the memory 27, the trail data creation module 29, and the display unit 31. The acquisition module 21 may acquire the echo based on the reflected wave from the target object, which corresponds to the transmitted electromagnetic wave (acquisition step). The echo data creation module 24 may create the echo data at least indicative of the position of the target object based on the echo (echo data creation step). Based on the echo, the determination data which is set, for every display area (in this embodiment, every pixel), of whether the trail data indicative of the moving trail of the target object is to be newly created may be created (determination data creation step), and be stored in the memory 27. The trail data creation module 29 may create the trail data based on the echo and the determination data (trail data creation step). The display unit 31 may display the echo data and the trail data (display step).

Thus, since the trail data can be created only for some of the echoes, only necessary trail data can be created and displayed, for example.

Although the suitable embodiment of the present disclosure is described above, the above configuration may be changed as follows, for example.

Although in this embodiment the example in which the land echo is used as the echo for which the trail data is not newly created is described, the present disclosure may also be applied to echoes other than land (target objects which do not move, such as fishing implements and route buoys). Moreover, in this embodiment "the area without the land echo" is used as "the area for which the trail data can be newly created" by identifying the position of the land echo. Alternatively, for example, by identifying the position of the echo of the moving target object, such as another ship, "the area where the echo of the moving target object exists" may be used as "the area for which the trail data can be newly created." Thus, the present disclosure can set "the area for which the trail data can be newly created" according to the type of the target object.

Moreover, a given condition may be set not based on the kind of the target object but based on properties of the echo (a moving speed, size, position, or stability), and the area where the echo which satisfies the condition exists may be used as "the area for which the trail data can be newly created." Note that the stability of the echo may refer to a small change in the signal level of the echo. Moreover, based on both the kind of the target object and the properties of the echo, it may be determined whether the trail data is to be newly created.

In this embodiment, although the memory 27 stores the determination data for one screen, it does not need to store the determination data for one screen at the same time, as long as it stores the determination data at least for pixels which are determined by the determination module 28. For example, when the radar apparatus 1 is detectable a Doppler speed of the target object based on the Doppler frequency, similar trail data may be created even if a determination of whether the echo is a moving target object is sequentially performed, based on the Doppler speed and the echo data which are sequentially inputted from the sweep memory 23, etc. Even in such a case, since the determination data is stored temporarily for the determination processing, the memory of the present disclosure may exist.

Although in this embodiment one example in which the present disclosure is applied to the relative trail mode among the relative trail mode and the true trail mode, the present disclosure is also applicable to the true trail mode. In the true trail mode, since land does not move, the trail will not be displayed. However, in practice, since the trail of the land echo may be displayed due to errors or delay of the direction sensor or the position sensor (GPS receiver) also in the true trail mode, it can be prevented more securely that the trail of the land echo is displayed by using the present disclosure.

Although in this embodiment the radar antenna 10 transmits the transmission wave while rotating in the horizontal plane, a radar apparatus having a configuration in which the radar antenna 10 does not rotate may also be used. For example, if it is a configuration of having antenna elements in all the circumferential directions, it is not necessary to rotate the radar antenna 10. Moreover, although in this embodiment the detection is possible over 360 degrees in the horizontal plane, the detection may be made only a specific direction, such as forward. Alternatively, the radar antenna 10 may have respective antennas for transmission and reception.

Although in this embodiment one example in which the present disclosure is applied to the ship is described, the present disclosure is also applicable to a radar apparatus mounted on moving bodies other than the ship (e.g., aircrafts).

What is claimed is:

1. A radar apparatus configured to mount on a movable body, the radar apparatus comprising:
   a receiver configured to receive an echo based on a reflected wave from a target object, of a transmitted electromagnetic wave;
   processing circuitry configured to create, based on the echo, echo data at least indicative of a position of the target object;
   a memory configured to store determination data that is set, for every given display area, and indicates whether trail data indicative of a moving trail of the target object is to be newly created based on the echo data;
   the processing circuitry further configured to create the trail data based on the echo data and the determination data when a size of the echo data is below a predetermined threshold; and
   an interface configured to output the echo data and the trail data.

2. The radar apparatus of claim 1, wherein the processing circuitry maintains the existence of the trail data when the trail data created previously exists in an area for which the trail data is not to be newly created.

3. The radar apparatus of claim 2, wherein the determination data is updated for every scan or every given scans.

4. The radar apparatus of claim 2, wherein the determination data is updated for every sweep or every given sweeps.

5. The radar apparatus of claim 2, wherein the determination data is set, for every pixel of a display, whether the trail data indicative of the moving trail of the target object is to be newly created.

6. The radar apparatus of claim 2, wherein the determination data defines whether the trail data is to be newly created according to a kind of the target object.

7. The radar apparatus of claim 6, wherein the determination data identifies an area where an echo of land exists as an area for which the trail data is not to be newly created.

8. The radar apparatus of claim 6, wherein the determination data identifies an area where an echo of a moving target object exists as the area for which the trail data is to be newly created.

9. The radar apparatus of claim 2, wherein the determination data defines whether the trail data is to be newly created according to a property of the echo.

10. The radar apparatus of claim 2, wherein the trail data is indicative of a relative positional change of the echo with respect to the apparatus.

11. The radar apparatus of claim 1, wherein the determination data is updated for every scan or every given scans.

12. The radar apparatus of claim 1, wherein the determination data is updated for every sweep or every given sweeps.

13. The radar apparatus of claim 1, wherein the determination data is set, for every pixel of a display, whether the trail data indicative of the moving trail of the target object is to be newly created.

14. The radar apparatus of claim 1, wherein the determination data defines whether the trail data is to be newly created according to a kind of the target object.

15. The radar apparatus of claim 14, wherein the determination data identifies an area where an echo of land exists as an area for which the trail data is not to be newly created.

16. The radar apparatus of claim 14, wherein the determination data identifies an area where an echo of a moving target object exists as the area for which the trail data is to be newly created.

17. The radar apparatus of claim 1, wherein the determination data defines whether the trail data is to be newly created according to a property of the echo.

18. The radar apparatus of claim 1, wherein the trail data is indicative of a relative positional change of the echo with respect to the apparatus while the apparatus is moving.

19. A method of displaying a trail, comprising:
   receiving, by a radar apparatus configured to mount on a movable body, an echo based on a reflected wave from a target object, of a transmitted electromagnetic wave;
   creating, based on the echo, echo data at least indicative of a position of the target object;
   creating determination data that is set, for every given display area, and indicates whether trail data indicative of a moving trail of the target object is to be newly created based on the echo data;
   creating the trail data based on the echo and the determination data when a size of the echo data is below a predetermined threshold; and
   outputting the echo data and the trail data.

20. A method of displaying a trail, comprising:
   receiving, by a radar apparatus configured to mount on a movable body, an echo based on a reflected wave from a target object, of a transmitted electromagnetic wave;
   creating, based on the echo, echo data at least indicative of a position of the target object;
   creating determination data that is set, for every given display area, and indicates whether trail data indicative of a moving trail of the target object is to be newly created based on the echo data;

creating the trail data based on the echo and the determination data when a size of the echo data is below a predetermined threshold; and displaying the echo data and the trail data.

* * * * *